United States Patent [19]

Misencik et al.

[11] 4,056,837

[45] Nov. 1, 1977

[54] GROUND FAULT CIRCUIT INTERRUPTER WITH TRIP LEVEL ADJUSTMENT

[75] Inventors: John J. Misencik, Shelton; Gary S. Zakrzewski, Bridgeport, both of Conn.

[73] Assignee: Westinghouse Electric Corporation, Pittsburgh, Pa.

[21] Appl. No.: 625,615

[22] Filed: Oct. 24, 1975

[51] Int. Cl.² .................................................. H02H 3/28
[52] U.S. Cl. ...................................................... 361/45
[58] Field of Search ............. 317/18 D, 18 R, 33 SC, 317/27 R

[56] References Cited

U.S. PATENT DOCUMENTS

| 3,296,493 | 1/1967 | Whittaker et al. | 317/18 D |
| 3,558,980 | 1/1971 | Florance et al. | 317/18 D |
| 3,633,070 | 1/1972 | Vassos et al. | 317/18 D |
| 3,676,737 | 7/1972 | Garzon | 317/18 D |
| 3,852,642 | 12/1974 | Engel et al. | 317/18 D |
| 3,930,187 | 12/1975 | Misencik | 317/18 D |

FOREIGN PATENT DOCUMENTS

| 1,763,550 | 8/1971 | Germany | 317/18 D |

Primary Examiner—J D Miller
Assistant Examiner—Patrick R. Salce
Attorney, Agent, or Firm—G. H. Telfer

[57] ABSTRACT

A sensing amplifier of half wave sensitivity has its trip level effectively changed without internal adjustment in the sensing amplifier by a circuit branch connected between respective points on the hot line conductor and the neutral conductor across the differential transformer core and containing a resistance for causing additional current flow vectorially added to differential current otherwise occurring between the primary windings.

4 Claims, 4 Drawing Figures

GROUND FAULT CIRCUIT INTERRUPTER WITH TRIP LEVEL ADJUSTMENT

BACKGROUND OF THE INVENTION

This invention relates to ground fault circuit interrupters of the differential transformer type.

Ground fault circuit interrupters are required to respond to a predetermined ground fault current that flows from the hot line conductor on the load side of the current transformer to a ground point. The value of fault current that trips the device is set by components in a sensing amplifier and trip circuit connected with the secondary sensing winding of the current transformer. Some such amplifiers are sensitive only to a single polarity of ground fault current and are quite effective for their intended purpose. One arrangement including a half wave sensitive sensing amplifier is that disclosed in U.S. Pat. No. 3,852,642, by Engel et al which should be referred to for further information and background.

The requirement for miniaturization of the device has led to the practice of making the sensing amplifier as a hybrid microelectronic unit separately packaged with its own encapsulation with leads for external connection but without access to internal connections in the unit. This means that fabrication of such a unit with chosen components sets the trip level and makes it impossible to alter the trip level without very time-consuming operations on the encapsulated package and great risk of the amplifier's destruction.

Ground fault interrupters for personnel protection in the United States have most frequently in the past been made to have a trip level of 5 milliamperes or less and are required not to trip at fault currents less than 2 milliamperes as required by standards of Underwriters Laboratories and other industry standards. Devices for such trip levels are referred to as Class A devices. Recently, however, there has been interest in making such devices with trip levels in the range of from 4 milliamperes to 6 milliamperes which are referred to as "New Class A" devices. It is apparent that a former Class A device does not meet the requirements of a "New Class A" device and packaged sensing amplifiers for former Class A devices have not heretofore been susceptible of any change or modification to permit them to perform within the new requirements. This of course limits the manufacturer's flexibility in that separate and distinct sensing amplifier units are required for each class or trip level for which he intends to make the devices.

SUMMARY OF THE INVENTION

The present invention is directed to the problem of utilizing a sensing amplifier in a ground fault interrupter with a preset trip level and, without requiring any internal modification of the amplifier unit, permitting variation of the trip level by external means, either to make the device more or less sensitive than the amplifier unit was originally designed and made for.

In accordance with this invention, a sensing amplifier of half wave sensitivity has its trip level effectively changed, without internal adjustment in the sensing amplifier, by providing a circuit branch connected between respective points on the hot line conductor and the neutral conductor across the differential transformer core and containing a resistance for causing additional current flow vectorially added to differential current otherwise occurring between the primary windings.

Where the amplifier is too sensitive and has too low a trip current for the intended product, such as where amplifiers for Class A devices are desired to be used in a "New Class A" device, it is simply the case that the extra circuit branch is connected between a point on the hot line conductor, on the supply side of the differential current transformer, and another point on the neutral conductor, on the load side of the differential current transformer. The resistance in the extra circuit branch causes a current to be developed that will flow in the neutral conductor from the load side to the supply side. Such a current is opposite to any fault current flowing in the hot line conductor from the supply side to the load side. Thus the flux developed by the extra current offsets that produced by the fault current so that the amplifier sees less of a fault current and is thereby made less sensitive.

Conversely, where greater sensitivity and a lower trip current is desired, the extra circuit branch is connected from the load side of the hot line to the supply side of the neutral and produces a current through the neutral conductor in the same direction as a fault current in the hot line conductor. It is to be noted that the circuit branch referred to is continually connected between the line and neutral conductors as distinguished from the previous and still required test circuit branch which is also connected from the load side of the hot line conductor to the supply side of the neutral conductor but which contains a selectively operated switch for occasional testing of the invention by causing a sufficient current unbalance for tripping even in the event of no ground fault current.

The invention provides a way for a manufacturer to fully utilize sensing amplifiers having a trip level different than that required in a given product. Additionally, the invention makes possible a wide choice of designs in trip levels for the electronic package with external adjustments always available to tailor the trip level to that desired for a specific product. An extension of this is that the packaged electronic unit may have on its exterior surface one or more discrete resistors available for connection in the extra circuit branch provided by this invention. Where more than one such resistor is provided they would be of different magnitude so as to permit selection from a choice of trip levels. For example, if an electronics unit is made for a first trip level and there are three resistors of different magnitude provided on the package, there are a total of seven trip levels available for use, that is the original trip level designed into the amplifier, and a trip level for each of the resistors connected in each of the directions for aiding and opposing additional current. Consequently, it can be seen that the invention provides much wider flexibility in the manufacture of ground fault circuit interrupters than has been previously available.

BRIF DESCRIPTION OF THE DRAWING

DESCRIPTION OF THE PREFERRED EMBODIMENTS

Figure 1:
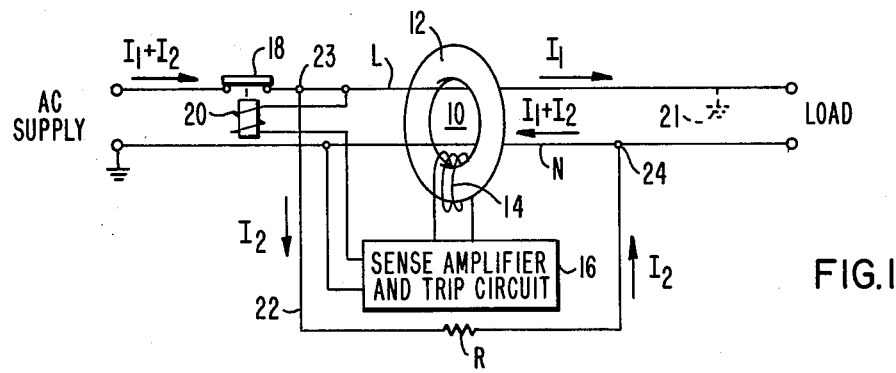
FIG. 1 is a circuit schematic of one embodiment of the present invention.

Referring to FIG. 1, ground fault interrupter apparatus of the differential transformer type is shown wherein a differential transformer 10 having a toroidal core 12 is provided with conductors, including a hot line conductor L and a neutral conductor N, extending through its primary windings, each of a single turn although multiple turn windings may be used if desired. A secondary sensing winding 14 is also provided on the core 12 for sensing an imbalance in the conduction current level of the primary conductors L and N. The sensing coil 14 is connected to a sensing amplifier and trip circuit 16 that is also connected between the L and N conductors on the supply side of the differential transformer. The circuit 16 is responsive to a level of sensed voltage on winding 14 to actuate a circuit breaker 18 through solenoid trip coil 20, thus opening the circuit through conductor L.

The arrangement shown as an example in FIG. 1 is for a single phase, two wire, system although it will be apparent that the invention may be practiced with other alternating current electrical systems.

The circuit 16 is one such as is desired in above-mentioned U.S. Pat. No. 3,852,642 that has half wave sensitivity. This means a fault current in the direction of I1 as shown in the drawing to a ground 21 on the load side of the conductor L will be sensed as might occur on the positive half cycle of an AC wave. However the arrangement is such that during the negative half cycle on conductor L, circuit 16 is not energized.

FIG. 1 is for the case in which the circuit 16 is too sensitive, such as if it is designed and built for Class A operation but it is desired to use it in a device for less sensitive operation. As is described in the Background, circuit 16 is an encapsulated unit without access to any internal connection and it is not desired to attempt any modification of its internal components. In accordance with this invention a circuit branch 22 is continually connected between points on conductors L and N on opposite sides of the transformer 10. In FIG. 1, to make a less sensitive device, branch 22 is connected between a point 23 on the supply side of conductor L and a point 24 on the load side of conductor N. Branch 22 has connected in it a resistor R so that there is continually developed a current I2 which during the positive half cycle of the AC wave is in the direction indicated in FIG. 1. Simultaneously with the occurrence of I1 as shown on conductor L, I1 and I2 will be flowing through the neutral conductor N in a direction to produce flux opposing that of I1. The circuit 16 therefore sees less of the current imbalance if there is a ground 21 and is made less sensitive.

The magnitude of I2 is determined by the choice of resistor R. For a specific case, as an example, where circuit 16 is designed for Class A operation and is as described in the above-mentioned patent, an appropriate value for R is about 56,000 ohms in order to result in a new Class A device at 110v AC. The current I2 will flow continually, of course, regardless of the occurrence of a ground fault but it is so small as to be essentially unnoticed in the operation of the electrical system during normal operation without the occurrence of fault.

Figure 4:
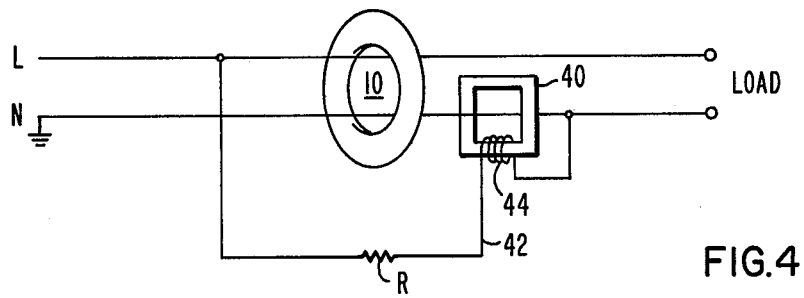

The arrangement of FIG. 1 for simplicity has left out other elements normally employed in ground fault circuit interrupters including grounded neutral protection means which may be as previously described in the art such as in copending application Ser. No. 368,915, filed June 11, 1973, now U.S. Pat. No. 3,959,693, issued May 25, 1976 by Coley et al. However, it is significant to note that by slight rearrangement of the grounded neutral transformer primary winding branch (which is shown in FIG. 1 of the copending application as the circuit branch between L and N including winding 34 and resistor 36) the new circuit branch 22 can be obtained without additional components. That is, if the circuit containing the grounded neutral winding is connected to L and N points on opposite sides of the transformer 10 (rather than both on the same side as in the copending case) its resistance will result in trip level adjustment in accordance with this invention. The former resistance of 33,000 ohms is typically replaced by one of 56,000 ohms to achieve the purposes of this invention as well as current limiting protection of the grounded neutral primary winding. FIG. 4 illustrates the relevant part of the apparatus of FIG. 1 herein to include the grounded neutral core 40 with branch 42 containing resistance R and winding 44.

Figure 2:
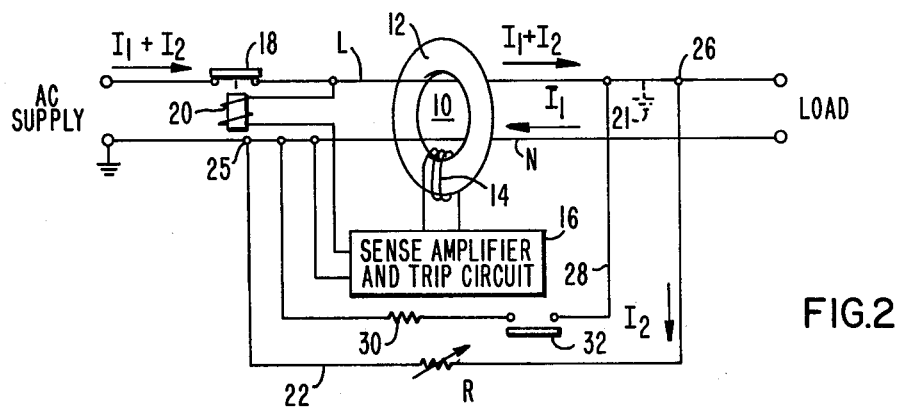
FIG. 2 is a circuit schematic of an alternate embodiment of the present invention.

In FIG. 2, elements are identified by reference numerals that are the same as for the corresponding elements of FIG. 1. However, here circuit branch 22 is connected between the point 25 on the supply side of the neutral conductor N and the point 26 on the load side of the conductor L. Therefore, the current I2 developed by resistor R during the positive half wave on conductor L will be in a direction as shown which produces flux that augments the flux produced by the current I1. When a fault current is flowing at ground 21, the circuit 16 sees an enhanced current imbalance and will trip sooner. Thus the arrangement of FIG. 2 is a way to make a preset trip level lower and the device more sensitive.

The circuit branch 22 is not to be confused with the normally required test circuit branch 28 connected between the load side of conductor L and the supply side of conductor N. Test circuit branch 28 includes a resistor 30 and a switch 32 for manual operation so that the operation of the device can be checked by closing the switch 32 and simulating a fault current condition which should trip the device in accordance with known practices. Circuit branch 22 is continually connected across the conductor and it develops a current I2 continually flowing in the system but, not affecting operation unless and until I2 bears the correct relationship to a ground fault current.

In FIG. 2, resistor R is shown as a variable resistance which may also be the case with resistor R in FIG. 1. The use of a variable resistance permits adjustment of the resistance value, and hence the magnitude of I2, either before or after assembly of the elements of the interrupter and also permits close tailoring of the trip level to a desired value so as to permit greater flexibility. For example if trip circuit 16 is designed for a desired trip level but manufactured units of circuit 16 turn out to be somewhat out of specifications, the use of variable resistor R will permit adjustment to the correct trip level.

Figure 3:
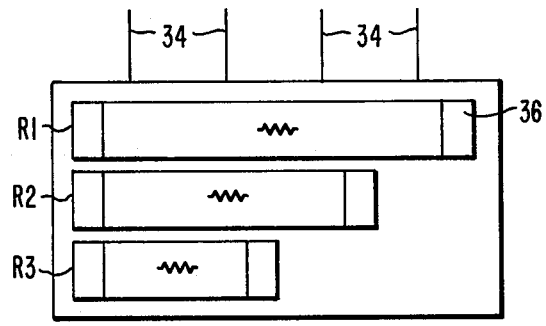
FIG. 3 is a generalized plan view of a packaged sensing amplifier and trip circuit provided with external selectable resistors in accordance with one aspect of the present invention; and, FIG. 4 is a schematic modification of FIG. 1.

One further form in which the invention may be practiced to provide a high degree of design flexibility is illustrated in FIG. 3 where the packaged electronic circuit 16 is made with a plurality of resistors printed or otherwise applied on the exterior surface of the encapsulated circuit 16. Resistors R1, R2 and R3 are different values which may be selected for interconnection in circuit branch 22 of either FIG. 1 or FIG. 2 as element R. The four leads 34 shown from circuit 16 are for connection to the sensing windings 14 by one pair and another pair for connection to the line and neutral as shown in FIGS. 1 and 2. The resistors R1, R2 and R3 have contact pads or terminal portions 36 for their interconnection in the circuit branch 22. A further form of this idea is to provide on the surface of the packaged circuit 16 a single continuous resistive strip with end terminal pad areas as well as a plurality of spaced intermediate terminal pad areas so that by the choice of the locations at which circuit branch 22 is connected thereto a desired resistive value can be obtained for a particular case.

It is therefore seen that the present invention provides a high degree of flexibility and the manufacture of ground fault circuit interrupters which contributes to the effectiveness and economy of the finished product.

We claim as our invention:

1. A ground fault circuit interrupter comprising:
a differential current transformer including a core, primary windings on said core that comprise a hot line conductor and a neutral conductor, a secondary winding on said core for sensing a differential current between said primary winding; a sensing amplifier responsive to said differential current to produce a signal for operating circuit interruption means upon a differential current being of predetermined magnitude, said sensing amplifier being characterized by responding only to a given polarity of current differential between said primary windings, sensitivity adjustment means for causing an effective change in the sensitivity of said sensing amplifier comprising a continually closed circuit branch connected between a first point on said hot line conductor on a first side of said core and a second point on said neutral conductor on a second side of said core, said circuit branch containing a resistance for causing additional current flow vectorially added to differential current otherwise occurring between said primary windings;
said sensing amplifier being responsive only to positive differential currents through said hot line conductor from the supply side of said core to the load side of said core; and
said first and second points of connection of said circuit branch being respectively on the supply side and the load side of said windings in relation to said core and said additional current flow being in opposition to said normal differential current and effectively causing said sensing amplifier to be less sensitive.

2. A ground fault circuit interrupter in accordance with claim 1 wherein:
said resistance in said circuit branch is variable for permitting adjustment of the sensitivity of said sensing amplifier either before or after assembly of the interrupter.

3. A ground fault circuit interrupter comprising:
a differential current transformer including a core, primary windings on said core that comprise a hot line conductor and a neutral conductor, a secondary winding on said core for sensing a differential current between said primary winding; a sensing amplifier responsive to said differential current to produce a signal for operating circuit interruption means upon a differential current being of predetermined magnitude, said sensing amplifier being characterized by responding only to a given polarity of current differential between said primary windings, sensitivity adjustment means for causing an effective change in the sensitivity of said sensing amplifier comprising a continually closed circuit branch connected between a first point on said hot line conductor on a first side of said core and a second point on said neutral conductor on a second side of said core, said circuit branch containing a resistance for causing additional current flow vectorially added to differential current otherwise occurring between said primary windings;
said sensing amplifier comprising an enclosed unit without accessible internal connections; said circuit branch and said resistance being exterior of said enclosed unit; and
said enclosed unit of said sensing amplifier having a plurality of resistors of different resistance on the exterior surface thereof from which said resistance connected in said circuit branch is selectable.

4. A ground fault circuit interrupter comprising:
a differential current transformer including a core, primary windings on said core that comprise a hot line conductor and a neutral conductor, a secondary winding on said core for sensing a differential current between said primary winding; a sensing amplifier responsive to said differential current to produce a signal for operating circuit interruption means upon a differential current being of predetermined magnitude, said sensing amplifier being characterized by responding only to a given polarity of current differential between said primary windings, sensitivity adjustment means for causing an effective change in the sensitivity of said sensing amplifier comprising a continually closed circuit branch connected between a first point on said hot line conductor on a first side of said core and a second point on said neutral conductor on a second side of said core, said circuit branch containing a resistance for causing additional current flow vectorially added to differential current otherwise occurring between said primary windings; and
an additional transformer core for grounded neutral protection having said circuit branch as a primary winding and having said neutral conductor as a secondary winding.

* * * * *